(12) United States Patent
Mestan

(10) Patent No.: US 10,472,489 B2
(45) Date of Patent: Nov. 12, 2019

(54) FLAME-PROOFED POLYMER COMPOSITION

(71) Applicant: BATEGU GUMMITECHNOLOGIE GMBH, Vienna (AT)

(72) Inventor: Gerhard Mestan, Vienna (AT)

(73) Assignee: BATEGU GUMMITECHNOLOGIE GMBH, Vienna (AT)

( * ) Notice: Subject to any disclaimer, the term of this patent is extended or adjusted under 35 U.S.C. 154(b) by 0 days.

(21) Appl. No.: 15/560,925

(22) PCT Filed: Mar. 24, 2016

(86) PCT No.: PCT/AT2016/050078
§ 371 (c)(1),
(2) Date: Sep. 22, 2017

(87) PCT Pub. No.: WO2016/149729
PCT Pub. Date: Sep. 29, 2016

(65) Prior Publication Data
US 2018/0051157 A1   Feb. 22, 2018

(30) Foreign Application Priority Data
Mar. 25, 2015   (AT) .............................. A50240/2015

(51) Int. Cl.
| C08K 3/22 | (2006.01) |
| C08K 3/38 | (2006.01) |
| C08K 3/016 | (2018.01) |
| C08L 9/00 | (2006.01) |
| C08L 23/08 | (2006.01) |
| C08L 31/04 | (2006.01) |

(52) U.S. Cl.
CPC ................ *C08K 3/22* (2013.01); *C08K 3/016* (2018.01); *C08K 3/38* (2013.01); *C08L 9/00* (2013.01); *C08L 23/0815* (2013.01); *C08L 31/04* (2013.01); *C08J 2300/22* (2013.01); *C08K 2003/2224* (2013.01); *C08K 2003/2227* (2013.01); *C08K 2003/387* (2013.01)

(58) Field of Classification Search
CPC .................................. C08K 3/016; C08L 9/00
See application file for complete search history.

(56) References Cited

U.S. PATENT DOCUMENTS

| 4,373,048 A | 2/1983 | Schubert et al. |
| 4,560,719 A | 12/1985 | Nakamura et al. |
| 4,671,896 A | 6/1987 | Hasegawa et al. |
| 5,011,163 A | 4/1991 | Hermann et al. |
| 2006/0270759 A1 | 11/2006 | Scott et al. |
| 2015/0203693 A1 | 7/2015 | Mestan |

FOREIGN PATENT DOCUMENTS

| DE | 38 31 894 | 5/1990 |
| EA | 16091 B1 | 2/2012 |
| EP | 0 331 358 | 9/1989 |
| EP | 2 343 334 | 7/2011 |
| RU | 2262526 C2 | 10/2005 |
| WO | WO 2005/037918 | 4/2005 |
| WO | WO 2010/069842 | 6/2010 |
| WO | WO 2014/019008 | 2/2014 |

OTHER PUBLICATIONS

International Search Report issued by the European Patent Office in International Application PCT/AT2016/050078 dated Jun. 27, 2016.
Russian Search Report dated Sep. 27, 2018 with respect to counterpart Russian patent application 2017135120/05(061428).
Translation of Russian Search Report dated Sep. 27, 2018 with respect to counterpart Russian patent application 2017135120/05(061428).

*Primary Examiner* — Peter F Godenschwager
(74) *Attorney, Agent, or Firm* — Henry M. Feiereisen LLC

(57) ABSTRACT

A flame-proof vulcanized polymer composition includes as a polymer component a halogen-free olefinic M-group elastomer with a saturated main chain at an amount of greater than 50 Parts per Hundred Rubber (phr) with respect to polymer components, a halogen-free water-releasing flame retardant or a combination of different halogen-free water-releasing flame retardants at an amount of in total 30 to 130 phr and a mineral oil plasticizer having an amount of less than or equal to 50 phr. Further disclosed are a method for producing the flame retardant vulcanized polymer composition, a flame-retardant article and an elastic flame-proof composite element.

32 Claims, No Drawings

FLAME-PROOFED POLYMER COMPOSITION

CROSS-REFERENCES TO RELATED APPLICATIONS

This application is the U.S. National Stage of International Application No. PCT/AT2016/050078, filed Mar. 24, 2016, which designated the United States and has been published as international Publication No. WO 2016/149729 A1 and which claims the priority of Austrian Patent Application, Serial No. A50240/2015, filed Mar. 25, 2015, pursuant to 35 U.S.C. 119(a)-(d).

BACKGROUND OF THE INVENTION

The invention relates to a frame-proofed polymer composition.

Elastic elements, made for example from rubber, having no flame-retarding or fire-retarding properties per se, are required for some applications, partly on the basis of standards or statutory requirements. Previously, natural rubber or chloroprene rubber (CR) has been used as base polymers for dynamic applications. They have excellent mechanical properties and wear characteristics, but no flame-retarding or fire-retarding properties that meet the requirements of EN 45545-2. This relates in particular to problems concerning smoke density (NR, CR) and toxicity (CR).

Achieving low flammability, in particular according to standard EN 45545-2, with the associated high requirements in respect of flame propagation, optical smoke density, smoke toxicity and heat release rate, requires special attention to the selection of the polymers. The high requirements regarding smoke density and toxicity essentially preclude, for example, the application of halogen-containing polymers, e.g. chloroprene rubber (CR) or R-group elastomers with unsaturated main chains, e.g. nitrile rubber, for example HNBR. M-group olefin polymers having a low resistance to crack formation and growth under static and dynamic stress, and poor resistance to lubricating oils and greases, such as vinyl-acetate-containing thermoplastic polymers, are preferably used, in order to meet the requirements with respect to smoke gas density in toxicity.

It is also known to use elastomers with large amounts of flame retardants and/or fire retardants, the material properties however being strongly affected by the incorporation of such substances, wherein an element made from such rubber can no longer fulfil the static and dynamic properties required for the application.

In a dynamic application, for example as a spring element or damping element or similar, typically hydrodynamically loaded elements, on vehicles for example, cannot on the other hand satisfactorily meet the required fire protection provisions using known elastic elements based on NR and CR.

Currently, for example for elastomer articles in the area of rail vehicles, the problem arises that both EN 45545-2 HL3 (e.g. R9, R22/23) as well as the requirements of DIN 5514 (profile) and/or of BN 918043 (elastomers for technical purposes) are not be equally satisfied using a single material.

In order to solve this problem, attempts have been made to provide material combinations in order to keep the protected elastic core free from flame retardants. Such composite elements are described for example in DE 38 31 894 A1 or WO 2010/069842.

Further polymers, flame-retardant-containing mixtures from ethylene vinyl acetate with ethylene propylene diene monomer rubber are known from the prior art. In most cases, cross-linking is achieved by peroxide cross-linking or by irradiation. Such mixtures are primarily used for coating cables or electrical lines. Thus, for example, flame-proofed compositions of EVA, EPDM and LLDPE are described in EP 2 343 334 A2, which comprise a peroxide cross-linking system formed through dicumyl peroxide. These materials are mostly based on EVA with small additions of EPDM/EPM or PE.

Numerous polymer mixtures with dynamically cross-linked thermoplastic elastomers (TPV and/or TPE-V) are also known. These are two-phase systems, in which finely dispersed cross-linked rubber particles are incorporated in a continuous plastic matrix. At room temperature, thermoplastic elastomers behave comparably to conventional elastomers, but are however plastically deformable on application of heat and exhibit thermoplastic behaviour at elevated temperatures. This is undesirable for use as damping components, for example for rail vehicles, where the components need to retain their elastic properties at higher temperatures. Thermoplastics elastomers are accordingly unsuitable for this purpose.

Further sulfur cross-linked mixtures of EPDM and EVA are described in WO 2014/019008, which can be filled with very large amounts of flame retardants and have accordingly good flame resistance, but which nevertheless retain their advantageous mechanical properties due to a special sulfur cross-linking system.

It is also often sought to use plasticisers in order to correct the mechanical properties impaired by the higher proportion of flame retardants, in particular in terms of hardness and stiffness. Such elastomer mixtures, for example those based on EPDM or EPM, typically contain high proportions of mineral oil plasticisers in order, in particular, to improve the processing properties (flowability) and to adjust the mechanical characteristics such as the hardness and modulus. Typical quantities used are from 50 to 200 phr (parts per hundred rubber) with respect to the polymer.

Mineral oils are petroleum products and complex compositions of hydrocarbon mixtures and comprise paraffinic, naphthenic and aromatic components. For non-polar or weakly-polar olefin elastomers, mineral oils are used for reasons of polarity and thus compatibility, which should have a proportion of aromatically bonded carbon atoms ($C_{aromatic}$) not greater than 50 wt. % with respect to 100 wt. % mineral oil. For reasons of polarity, only mineral oils with predominantly paraffinic or naphthenic components can be used for these constituents.

A typical formulation of such a known polymer composition comprises the following composition:
EPDM 100 phr
carbon black 20 phr
aluminium hydroxide (ATH) 180 phr
zinc borate 50 phr
plasticiser 45 phr
cross-linking chemicals: 12 phr
processing aids: 5 phr The content of water-releasing flame retardants in this case is 230 phr, Such mixtures can fulfil the fire protection requirements of EN 45545-2 (R22/23, R9), but are however disadvantageous due to the poor mechanical properties resulting from the high content of flame retardants:
hardness: 64 Shore A
density: 1.47 g/cm$^3$
elasticity: 31%
tensile strength 4.2 MPa
elongation at break 560%
wear volume: >600 cm$^3$

SUMMARY OF THE INVENTION

The problem addressed by the invention is therefore that of overcoming these disadvantages and providing a flame-proofed polymer material that has exceptional fire protection properties, in particular complying with standard EN 45545-2 HL3, in combination with improved mechanical or dynamic characteristic values.

According to one aspect of the invention, a flame retardant, vulcanised polymer composition includes at least one halogen-free water-releasing flame retardant or a combination of different halogen-free water-releasing flame retardants are contained in a proportion of in total 30 to 130 phr, and the proportion of mineral oil plasticisers in the composition is less than or equal to 50 phr.

As described above, it is usual that in such elastomers that the content of flame retardant is set as high as possible in order to meet the fire protection standards. However, as this will often worsen mechanical properties to below tolerable values, attempts have been made to counteract this through the use of larger amounts of mineral oil plasticisers and to thus improve the mechanical properties.

However, it has now been surprisingly observed that this approach, i.e. the indiscriminate use of mineral oil plasticisers, is counter-productive and can result in significant disadvantages with respect to fire performance.

Accordingly, it was not expected that in the case of the composition according to the invention, despite the counter-intuitive and considerable reduction of the proportion of water-releasing flame retardants to below 130 phr, contrary to expectations no reduction in the fire protection properties arose, rather it was possible to meet both the fire protection standard EN 45545-2 as well as the required mechanical properties DIN 5514 (profile, e.g. tensile strength>8.5 MPa, wear volume<300 mm$^3$) and/or BN 918043 (elastomers for technical purposes, tensile strength>8 Mpa GI and wear volume less than or equal to 300 mm$^3$ for N II).

The proportion of additives in the mineral oil plasticisers was found to be relevant in this context. These additives should be kept as low as possible, or even excluded, in the mixture. A mineral oil plasticiser content exceeding the value of 50 phr leads to a clear deterioration in the fire protection properties, particular to a deterioration of the flame-proofing properties in terms of self-extinguishing, and the standard can no longer be complied with. The underlying knowledge, that in the present case it is not only the amount of flame retardants that determines the fire performance, but rather the fire performance is also achieved through the reduction or absence of mineral oil additives, is accordingly also novel.

Simultaneously, through the reduction in the amount of flame retardant, improved mechanical properties are achieved, which goes hand-in-hand with improved dynamic properties.

The proportion of M-group olefinic elastomers with saturated main chain of greater than 50 phr is likewise advantageous for good dynamic properties.

Further advantageous embodiments and developments of the composition result from the features of the dependent claims:

Advantageous dynamic properties are achieved if the olefinic elastomer is contained in a proportion of greater than or equal to 70 phr or in a proportion of 100 phr as the only polymer component.

In order to further improve the properties of the composition, and in particular the fire resistance, it is advantageous if at least one mineral oil plasticiser with a maximum proportion of less than or equal to 20 phr, preferably less than or equal to 10 phr, is contained as the, preferably sole, plasticiser. Very advantageous flame-retardant properties are achieved if the composition is entirely free of mineral oil plasticisers.

In order to achieve good fire-protection properties, with as small as possible an influence on the material properties, it has proven to be advantageous to add magnesium hydroxide (MDH), aluminium hydroxide (ATH), antimony trioxide, nanoclays and/or zinc borate as the flame retardant, preferably a synergistically acting mixture of two or more thereof. In particular, the flame retardant or flame retardants are solid and in powder form or crystalline.

In order to obtain a good flame-proofing action (self-extinguishing) with simultaneously improved mechanical properties, solid water-releasing flame retardant (e.g. ATH, MDH, zinc borate) is/are contained in an amount of 50 to 110 phr, preferably 60 to 100 phr with respect to the polymer, provided the mineral oil content is less than 50 phr. The reduction in the flame-proofing content improves the mechanical parameters, in particular the dynamic and elastic properties of the composition. Self-extinguishing is achieved in the event of a fire.

The olefinic elastomer is advantageously a homopolymer or a copolymer or a terpolymer made from or comprising diene monomer units, in particular a terpolymer consisting of ethylene, propylene and a diene-containing termonomer, preferably having a termonomer proportion of at least 0 wt. % to 12 wt. % with respect to the olefinic elastomer (according to ASTM D 6047). In this way, the double bonds required for sulfur cross-linking can also be provided.

In this context, it is advantageous if the olefinic elastomer is selected from the group consisting of ethylene propylene diene rubber (EPDM) and ethylene propylene rubber (EPM) and/or that the composition consists of ethylene propylene diene rubber (EPDM) and/or ethylene propylene rubber (EPM) as individual polymer components. In the event of fire, ethylene propylene diene rubbers (EPDM) have large advantages in terms of their low smoke density and toxicity. EPDM rubbers can also be formulated with a wide range of hardness and mechanical characteristic values. Further, EPDM rubbers offer advantages in terms of resistance to weather, ultraviolet, ozone and heat, and serve as a protective layer that can minimise the ageing of dynamically stressed components to be protected, for example components made from natural rubber.

The halogen-free, M-group olefinic rubbers, e.g. EPM or EPDM, with particularly high molecular weight can be extended with mineral oils by the manufacturer, in order to improve the processing behaviour.

Preferably, non-conjugated diene monomer units are contained, selected from the group of 1,3-butadiene, 2-methyl-1,3-butadiene (isoprene), 2,3-dimethyl-1,3-butadiene, 1,3-pentadiene, 1,3-cyclopentadiene, dicyclopentadiene, 2-methyl-1,3-pentadiene, 1,3-hexadiene, 1,4-hexadiene, 1,4-cyclohexadiene, tetrahydroindene, methyl tetrahydroindene, ethylidene norbornene or 5-ethylidene-2-norbornene (ENB), 5-methylene-2-norbornene (MNB), 1,6 octadiene, 5-methyl-1,4-hexadiene, 3,7-dimethyl-1,6-octadiene, 5-isopropylidene-2-norbornene, 5-vinyl-2-norbornene (VNB).

It is particularly advantageous if the ethylene propylene diene monomer rubber (EPDM) is a terpolymer made from ethylene, propylene and 5-ethylidene-2-norbornene (ENB) or dicyclopentadiene (DCPD), preferably comprising a termonomer proportion of at least 2 to 12 wt. % with respect to the terpolymer (in accordance with ASTM D 6047).

Due to the relatively low double bond content of EPDM with respect to other diene rubbers, a higher amount of accelerator needs to be used in order to achieve an economically worthwhile vulcanisation speed. The solubility in EPDM of sulfur and the most polar accelerator or accelerator residue is low. For this reason, a combination of a plurality of accelerators is used, in order to avoid blooming.

Cross-linking with sulfur and sulfur donors presupposes the presence of double bonds of the ter-components. The length of the suffer bridges and the cross-link density are determined by the ratio of sulfur, sulfur donors and accelerators and the type of accelerator.

Frequently used accelerators include sulfonamides, e.g. N-cyclohexyl-2-benzothiazylsulfenamide (CBS), thiazoles, e.g. 2-mercaptobenzothiazole (MBT), dithiocarbamates, e.g. zinc dibenzyldithiocarbamate (ZBEC), guanidines, e.g. diphenylguanidine (DPG), or thiophosphates. Sulfur donors include e.g. thiuram, caprolactam disulfide or phosphoryl polysulfide.

Olefinic elastomer copolymers, such as EPM, are typically cross-linked using peroxides. Typical peroxides include dicumyl peroxide, di(2-tert-butylperoxyisopropyl) benzene and 2,5-dimethyl-2,5-di-(tert-butylperoxy)hexane, 1,1-di(tert-butylperoxy)-3,3,5-trimethylcyclohexane and n-butyl-4,4-di(t-butylperoxy)valerate.

According to an advantageous embodiment, in addition to the M-group elastomers, the composition contains at least one further polymer component, in particular a further, different elastomer, e.g. an R-group or Q-group (silicone) elastomer, or a thermoplastic polymer. Preferably the polymer components of the composition are in the form of a single-phase, homogeneous polymer mixture or blend.

According to a further advantageous embodiment, a vinyl-acetate-containing thermoplastics polymer is contained as a further polymer component, in particular a homopolymer, copolymer or terpolymer of the vinyl acetate and preferably selected from the group of polyvinyl acetate (PVAc) or ethylene vinyl acetate (EVA).

A particularly low smoke density is obtained simultaneously with good chemical properties, if the vinyl-acetate-containing polymer comprises a vinyl acetate proportion of 40 to 75 wt. %, (LP Testing instruction No. 015, Lanxess).

Ethylene vinyl acetate is mostly used in the field of cables. The polar vinyl acetate group simultaneously improves the flame resistance and the oil resistance Smoke density is low and the smoke gas has no toxicity. Ethylene vinyl acetate simultaneously has an excellent resistance to weather, ultraviolet, ozone and heat.

In this context, it is advantageous if the vinyl-acetate-containing polymer has a melting temperature or a beginning of the melting region of less than 150° C., preferably less than 100° C., and if appropriate a low viscosity at typical rubber processing temperatures. A good mixture can be achieved in this way and, at the same time, vulcanization is entirely prevented.

An advantageous composition is characterised in that it contains EPM or EPDM at 50 to 100 phr, in particular 70 to 100 phr, preferably 80 to 100 phr, vinyl-acetate-containing polymer in an amount from 0 to 50 phr, in particular 0 to 30 phr, preferably 0 to 20 phr, in each case with respect to the total weight of the polymers, wherein the values in phr relate respectively to the ratio of the pure polymer components to one another or to the amount of polymers EVA+EPDM (=100 phr) without filler, additive or flame retardant. In this way, an intimate mixture of the polymer components and an approximately single-phase system is obtained.

Vinyl-acetate-containing polymers without double bonds in the main chain and without double-bond containing monomers are usually cross-linked using peroxides.

If vinyl-acetate-containing polymers are used together with EPDM, it may also be desired to form a continuous network by sulfur cross-linking only the EPDM, and the vinyl-acetate-containing polymer is present with no cross-linking.

Paraffinic plasticisers are often used for plasticising vinyl-acetate-containing polymers. Synthetic plasticisers such as adipates or sebacates are used to improve low-temperature flexibility, and phosphoric acid esters are used, for example, to improve the flame-proofing effect.

Particularly advantageous compositions in terms of the mechanical and fire-retarding properties thereof, consist of the following polymer components:
ethylene propylene diene rubber (EPDM) or
ethylene propylene rubber (EPM) or
ethylene propylene diene rubber (EPDM) and ethylene vinyl acetate (EVA) as homogeneous polymer mixture, or
  ethylene propylene rubber (EPM) and ethylene vinyl acetate (EVA) as a homogeneous polymer mixture, or
  ethylene propylene diene rubber (EPDM) and polyvinyl acetate (PVAc) as a homogeneous polymer mixture, or
  ethylene propylene rubber (EPM) and polyvinyl acetate (PVAc) as a homogeneous polymer mixture.

In order to achieve further desired and/or required properties of the flame-retarding polymer composition, it is additionally proposed that the material contains further additives such as dyes, carbon black, processing aids, anti-ageing agents or similar and cross-linking agents. Phosphoric acid ester is applied during the use of flame-proofing plasticisers, which because of its polarity is only compatible with a limited range of non-polar rubbers. A particularly advantageous qualitative and quantitative composition is as follows:
- ethylene propylene diene rubber (EPDM) or ethylene propylene rubber (EPM): 70-100 phr,
- vinyl-acetate-containing polymer, in particular ethylene vinyl acetate (EVA): 0-30 phr,
- mineral oil plasticiser 0-10 phr,
- flame retardant, in particular aluminium hydroxide (ATH): 60 to 100 phr,
- carbon black, variable depending on the hardness: 0-80 phr,
- remainder process materials, additives etc.

If the polymer component or the polymer components of the composition, i.e. the M-group elastomers and/or the further polymer components are single-phase and homogeneous, in particular without a macroscopic or microscopically visible phase separation, and/or form a substantially, in particular both macroscopic and microscopically visible single-phase and homogeneous mixture, in particular without phase separation being visible by the naked eye and/or using light microscopy, particularly advantageous mechanical properties of the polymers arise, in particular with respect to the elastic and dynamic characteristics. This includes the fact that the mixture is advantageously single-phase, such that, in the mixture and/or in the final composition, there are no elastomer particles having an average particle diameter of greater than 0.5 μm, in particular greater than 0.1 μm, preferably greater than 0.01 μm, and/or no rubber domains with an average diameter of greater than 0.5 μm, in particular greater than 0.1 μm, preferably greater than 0.01 μm. In particular there are no identifiable or detectable polymer particles or rubber domains present. The composition, the polymer components and/or the polymer mixture is also free of dispersed elastomer particles or rubber domains. There is an entirely interpenetrating, chemically cross-linked network of individual polymer components.

In this context, it is particularly advantageous if or that the vulcanised polymer mixture comprises exclusively elastomers and has no thermoplastic properties, or if or that the vulcanised polymer mixture or the composition has in particular mainly elastomer properties in both the temperature region of the application as well as at elevated temperatures of 150 to 200° C., for short periods of time. This also represents an important difference from thermoplastic elastomers and thermoplastic elastomers to be cross-linked (TPE-V):

Thermoplastic elastomers (TPE-V) cross-linked by dynamic vulcanisation have, in the area of application at low temperatures, e.g. at room temperature, largely elastomer properties, and behave comparably, in this region, to conventional elastomers. However, in the processing region at elevated temperature, they have predominantly thermoplastic properties, and are accordingly able to flow and are plastically deformable or heat deformable and have a characteristic melting point or melting region or softening region. The properties here are determined by the thermoplastic, non-cross-linked matrix of polypropylene or vinyl acetate for example. The elastomer particles, embedded and cross-linked therein, have certain elastic properties, but however have no substantial influence on the hot workability and the flowability.

However, depending on the vulcanisation, the compositions according to the invention have almost exclusively elastomer or rubber-elastic properties over the entire relevant temperature spectrum, both in the application range as well as in the elevated temperature range. When the temperature is increased, the bodies soften but are never able to flow, having no melting point or melting region. Accordingly, in the temperature range up to 200° C., the vulcanised polymer mixture or the composition has no melting peak as measured by differential scanning calorimetry. Moreover, following vulcanisation, no hot forming and no second shaping step is possible.

Thermoplastic elastomers are therefore also substantially less thermally and dynamically loadable than the advantageous compositions according to the invention, and tend to creep at elevated temperatures.

An advantageously vulcanised polymer mixture or composition also has, in a temperature range from room temperature to approximately 200° C., a loss factor (ratio of the loss modulus to the storage modulus under dynamic stress) of tan $\delta$<0.3, measured according to ISO 4664 "elastomers or thermoplastic elastomers—determination of dynamic properties". This shows that in a temperature range in which the TPE-Vs are typically processed, the elastic properties of the composition according to the invention predominate in comparison with the viscous properties and thus no further shaping is possible.

It is also advantageous that the composition is not formed as a thermoplastic elastomer (TPE), in particular not as an olefin-based thermoplastic elastomer (TPE-O) or as a cross-linked olefin-based thermoplastic elastomer (TPE-V).

A particularly advantageous composition according to the invention is produced or obtainable by mixing the polymer component or polymer components to form a homogeneous blend and, in particular, subsequent incorporation of cross-linking agents, the flame retardant and if necessary further additives and/or process materials, while strictly avoiding any cross-linking or vulcanisation, preferably at a temperature of at most 110° C. A shaping step and the vulcanisation only takes place after this, in particular at an elevated temperature and if necessary under pressure. The vulcanisation does not take place under shear stress, i.e. not during intensive mixing as in dynamic vulcanisation.

Advantageously, the vulcanisation temperature, in particular with EPDM/EVA, is at a temperature of less than 240° C., preferably in a temperature range from 130 to 190° C. This represents a further difference from cross-linked thermoplastic elastomers in which the cross-linking already takes place by means of dynamic vulcanisation during mixing at high temperature and in the presence of strong shear stress. In contrast to this, for the composition according to the invention, vulcanisation is avoided during mixing and the cross-linking first takes place at the end, in particular after shaping, at elevated temperature, but not in the presence of shear stress. In this way, the properties of the composition that are typical of rubber, also have a positive influence with a high flame retardant content.

The resulting advantageous composition can thus be obtained by "static" vulcanisation, in particular after shaping. In the present case, the term static vulcanisation shall be understood to mean vulcanisation whilst avoiding any shear stress or avoiding any dynamic vulcanisation.

The composition according to the invention advantageously has the following characteristic values:
- a hardness of 40 to 90 Shore A, preferably 55 to 85, Shore A (DIN ISO 7619-1) and/or
- a tensile strength >5 MPa, preferably >7 MPa (DIN 53504) and/or
- a tear resistance of >7 N/mm, preferably >10 N/mm (DIN ISO 34-1B) and/or
- a wear volume <400 $mm^3$, preferably <300 $mm^3$ (DIN ISO 4669) and/or
- a density <1.4 $g/cm^3$, preferably <1.3 $g/cm^3$ (DIN ISO 1183-1) and/or
- a MARHE value (ISO 5660-1) <90 $kW/m^2$, in particular <60 $kW/m^2$ and/or meets the requirements of standard EN 45545-2 HL 3 R9/R22/23.

From this, it is clear that the essential characteristic values for the dynamic and elastic properties are retained and that the mechanical characteristic values are substantially higher than for current standard flame-proofing mixtures according to EN 45545-2.

In order to improve the requirements with respect to smoke density and toxicity, it is advantageous if all the polymer components, in particular the entire composition, are halogen free.

In this context, the invention also comprises a method for producing an advantageous composition according to the invention, wherein polymer components, the cross-linking agent or agents, the flame retardant or flame retardants and, if appropriate, further additives and process materials are first mixed so as to form a homogeneous blend, while avoiding cross-linking and/or vulcanisation, and subsequently followed by a shaping step, for example by injection (IM). Only then, at the earliest during or at the end of shaping, in particular after fully completed shaping, is the vulcanisation carried out, and indeed by static, non-dynamic vulcanisation avoiding shear stress.

It is particularly advantageous for avoiding premature vulcanisation in this context, if the step of mixture creation before shaping is carried out at below a critical temperature and within a critical time, in particular at a temperature of at most 125° C., preferably in the range from 50° C. to at most 110° C. During preparation of the mixture, the blend or polymer components are present in a softened state.

A further advantageous method, likewise in order to avoid premature cross-linking or vulcanisation, involves the shaping being carried out at below a critical temperature and within a critical time, in particular at a temperature of at most 130° C., in particular in the range from 70° C. to 100° C.

The actual vulcanisation then advantageously takes place at a temperature of at most 240° C., in particular in the range from 160° C. to 180° C. Advantageously, the cross-linking takes place at a higher temperature than the mixing and/or shaping, in particular also at a pressure of 100 to 200 bar, or if appropriate without pressure.

Through these method steps or method procedure an advantageous composition results or is obtained, which has the desired features.

In comparison to the method according to the invention, in the known "dynamic vulcanisation" such a polymer mixture is mixed in the presence of a high shear stress and thus simultaneously vulcanised, i.e. before shaping. In this way, small droplets are formed from the unsaturated elastomers, in which the cross-linking takes place. The intensive processing at high shear stress leads to a permanent isolation of these droplets and has the result that no connections or sulfur bridges are formed between the individual droplets. In this way, for example, a uniform thermoplastic matrix is formed from vinyl-acetate-containing polymer, e.g. EVA, in which isolated islands of elastomers, e.g. EPDM, are present, dispersed in this thermoplastic matrix. No connections exist between the individual separate elastomer particles. Thus there is no network running through the entire matrix of mixture bodies obtained in this way, which runs completely through the bodies, rather the cross-linking is exclusively limited to the individual elastomer particles In contrast to this, through the advantageous method according to the invention, no isolated, internally cross-linked elastomer particles are formed, rather an interpenetrating mixture is formed comprising the chains of vinyl-acetate-containing polymer and the elastomer chains. The polymer components are present as chemical, wide-mesh, cross-linked, spatial network molecules, wherein the cross-linking cannot be released without decomposition of the materials. The polymer mixture is free from vulcanised elastomer particles dispersed therein, in particular free from elastomer particles or rubber domains with an average (particle) diameter of greater than 0.5 µm, in particular greater than 0.1 µm, preferably greater than 0.01 µm.

The invention further relates to a flame-proofed article. This article can potentially consist exclusively of the composition according to the invention, for example as a moulded part. Alternatively, such an article may only partially comprise said composition, for example in the form of a coating on a base body, for example on a fabric.

The invention also relates to an elastic composite element, suitable for damping oscillations and vibrations, and for suspension, comprising a base body which is provided with a coating of the composition according to the invention, at least partially or in sections, on the outer surface thereof, if appropriate over the entire outer surface thereof. In the event of a combination of materials, it is advantageous if the base body is mostly formed from rubber, for example from polybutadiene rubber, styrene butadiene rubber, acrylonitrile rubber, ethylene propylene diene rubber, foam rubber or mixtures thereof, preferably from natural rubber. The required elastic and/or dynamic properties of the base body of the elastic elements are in addition preferably strengthened and/or supported such that filler and/or strengthening material, plasticiser, vulcanisation accelerator, cross-linking agent, ageing protection agent or similar are added to the base body in a known manner. According to a preferred further development, the coating is bonded to the base body in a fixed and inseparable manner, wherein the coating on the base body is preferably applied by assembly, extrusion, pressing, spraying and subsequent co-extrusion. Through the above described method, it is possible in a simple and reliable way to produce the elastic composite element comprising the base body and the flame-retarding and/or fire-retarding coating by producing an appropriately secure bond between the base body and the coating. According to the invention, the base body is further provided with a reinforcement, for example fibres, in particular glass fibres, synthetic fibres, CRP fibres, GRP fibres, a material or fabric or similar.

The invention further relates to the advantageous use of the material, the article or the elastic composite elements as a spring element, damping element, seal, hose, mat, moulded part, protective clothing, etc. or as components thereof. The article can advantageously also be used, in particular when formed as an endless profile or elastomer profile, in particular for windows or for sealing between frames and glass.

DETAILED DESCRIPTION OF PREFERRED EMBODIMENTS

Examples of the composition according to the invention:

EXAMPLE 1

EPDM mixture without vinyl-acetate-containing polymer
Cross-linking: Sulfur:
Hardness: approx. 50 80 Shore A
Recipe data in phr

| Mixture number | 1.0 | 1.1 | 1.2 | 1.3 | 1.4 | 1.5 | 1.6 | 1.7 |
| --- | --- | --- | --- | --- | --- | --- | --- | --- |
| Hardness, Shore A | 56 | 52 | 55 | 58 | 60 | 63 | 72 | 80 |
| EPDM (Ethylene: 55 wt. %, ENB: 6.5 wt. %) | 100 | 100 | 100 | 100 | 100 | 100 | 100 | 100 |
| Paraffinic mineral oil with $C_{aromatic}$: 2% | 55 | 50 | 40 | 25 | 18 | 12 | 5 | 0 |
| Carbon black Durex O/35 (Iodine Absorption Number: 30 mg/g; ASTM D 1510) | 15 | 15 | 15 | 15 | 27 | 40 | 50 | 60 |
| Al(OH)$_3$ with $d_{50}$ = 1 µm | 160 | 80 | 70 | 60 | 60 | 60 | 60 | 60 |
| Zinc borate $d_{50}$ = 2.1 µm | 10 | | | | | | | |
| Zinc oxide, BET = 4.5 m$^2$/g | 5 | 5 | 5 | 5 | 5 | 5 | 5 | 5 |
| Ground sulfur | 1.5 | 1.5 | 1.5 | 1.5 | 1.5 | 1.5 | 1.5 | 1.5 |
| Deovulc BG 187 (accelerator mixture) | 5 | 5 | 5 | 5 | 5 | 5 | 5 | 5 |
| Stearic acids | 1 | 1 | 1 | 1 | 1 | 1 | 1 | 1 |

-continued

| Mixture number | 1.0 | 1.1 | 1.2 | 1.3 | 1.4 | 1.5 | 1.6 | 1.7 |
|---|---|---|---|---|---|---|---|---|
| Silicic acid/kaolinite mixture with $d_{50}$ < 2.4 μm | 15 | 15 | 15 | 15 | 15 | 15 | 15 | 15 |
| Hardness, Shore A | 56 | 52 | 55 | 58 | 60 | 63 | 72 | 80 |
| Fire test 1 | | | | Burner test | | | | |
| Extinguishing time, s | 50-100 | >100 | >100 | 50-100 | 40 | <6 | <5 | <3 |
| Assessment | Weakly after-burning | Moderately after-burning | Moderately after-burning | Weakly after-burning | Self-extinguishing | Self-extinguishing | Self-extinguishing | Self-extinguishing |
| Fire test 2 | | | | | EN 45545-2, R9 | | | |
| Smoke gas density (ISO 5669-2): $D_S$max | 105 | 90 | 85 | 71 | 58 | 57 | <60 | <60 |
| Smoke gas toxicity (ISO 5669-2): $CIT_G$ | 0.04 | 0.02 | 0.02 | 0.02 | 0.02 | 0.02 | 0.018 | 0.015 |
| Heat release rate (ISO 5660-1): MARHE (kW/m²) | >90 | 80 | 77 | 65 | 58 | 57 | 54 | 50 |
| | Not met | R9/HL2 | R9/HL2 | R9/HL2 | R9/HL3 | R9/HL3 | R9/HL3 | R9/HL3 |
| Hardness, Shore A | 56 | 53 | 55 | 56 | 60 | 63 | 72 | 80 |
| Density, g/cm³ | 1.42 | 1.22 | 1.22 | 1.23 | 1.24 | 1.25 | 1.27 | 1.29 |
| Elasticity, % | 39 | 53 | 53 | 53 | 49 | 46 | 42 | 36 |
| Notch toughness, N/mm | 6.2 | 7.2 | 7.3 | 7.6 | 8.4 | 9.8 | 12.8 | 14.1 |
| Tensile strength, MPa | 4.7 | 6.9 | 7.2 | 7.3 | 7.5 | 7.8 | 7.9 | 8.1 |
| Elong. at break % | 481 | 510 | 500 | 480 | 420 | 390 | 340 | 310 |
| Wear volume, mm³ | 620 | 290 | 294 | 297 | 291 | 285 | 270 | 261 |

Among other things, it can be seen here that the standards for fire protection are already fulfilled at less than 50 phr mineral oil, and simultaneously the mechanical and dynamic values are advantageous.

EXAMPLE 2

EPDM mixture without vinyl-acetate-containing polymer

Hardness: 80 Shore A

Cross-linking: Peroxide

Reference: Mixture 2.1 not flame-proofed

Recipe data in phr

| Mixture | 2.1 | 2.2 | 2.3 | 2.4 |
|---|---|---|---|---|
| EPDM (Ethylene content: 48 wt. %, ENB: 7.8 wt. %) | 100 | 100 | 100 | 100 |
| Carbon black N 550 | 60 | 60 | 60 | 50 |
| Paraffinic mineral oil with $C_{aromatic}$: 2% | 0 | 20 | 10 | 0 |
| Al(OH)$_3$ with $d_{50}$ = 1 μm | 0 | 100 | 100 | 50 |
| Di-(2-tert-butyl-peroxyisopropyl)-benzene | 6 | 6 | 6 | 6 |
| Trimethylolpropane trimethacrylate | 1 | 1 | 1 | 1 |
| Silicic acid/kaolinite mixture with $d_{50}$ < 2.4 μm | 10 | 20 | 20 | 10 |
| Fire test 1 | | Burner test | | |
| Extinguishing time, s | >100 | 50-100 | 15 | <3 |
| Assessment | Not self-extinguishing, burns increasingly | Weakly after-burning | Self-extinguishing | Self-extinguishing |
| Hardness, Shore A | 80 | 75 | 81 | 80 |
| Density, g/cm³ | 1.10 | 1.34 | 1.36 | 1.25 |
| Elasticity, % | 56 | 45 | 52 | 48 |
| Notch toughness, N/mm | 12 | 10 | 10.2 | 10.5 |
| Tensile strength, N/mm² | 12.7 | 8.1 | 9.4 | 10.4 |
| Elong. at break % | 155 | 217 | 167 | 190 |

EXAMPLE 3

EPDM mixture with vinyl-acetate-containing polymer

Cross-linking: Peroxide

Hardness: 75-80 Shore A

Recipe data in phr

| Mixture | 3.1 | 3.2 | 3.3 |
|---|---|---|---|
| EPDM (Ethylene content; 52 wt. %, ENB: 7.5 wt. %) | 90 | 90 | 80 |
| EVA with 60 wt. % VAC | 10 | 10 | 20 |
| Carbon black N 550 | 50 | 50 | 50 |
| Paraffinic mineral oil with $C_{aromatic}$: 2% | 20 | 10 | 10 |
| Mg(OH)$_2$, $d_{50}$ = 0.9 μm | 110 | 90 | 90 |
| Zinc borate $d_{50}$ = 2.1 μm | 10 | 10 | 10 |
| Di-(2-tert-butyl-peroxyisopropyl)-benzene | 7 | 7 | 7 |
| Trimethylolpropane trimethacrylate | 1 | 1 | 1 |
| Silicic acid/kaolinite mixture with $d_{50}$ < 2.4 | 15 | 15 | 15 |
| Fire test 1 | | Burner test | |
| Extinguishing time, s | 15 | 10 | spontaneous |
| Assessment | Self- | Self- | Self- |
| Hardness, Shore A | 77 | 78 | 78 |
| Density, g/cm³ | 1.32 | 1.31 | 1.31 |
| Elasticity, % | 47 | 46 | 42 |
| Notch toughness, N/mm | 10.1 | 12.2 | 11.8 |
| Tensile strength, N/mm² | 9.3 | 9.5 | 9.6 |
| Elong. at break % | 189 | 205 | 210 |

In examples 2 and 3, the effects of the mineral oil content and the flame retardant content can be seen

EXAMPLE 4

EPDM with butyl rubber (IIR) (R-type elastomer)

Hardness: 46 Shore A

Cross-linking: Sulfur:

Recipe data in phr

| Mixture number | 4.0 |
|---|---|
| Hardness, Shore A | 46 |
| EPDM (Ethylene: 55 wt. %, ENB: 6.5 | 70 |
| IIR (ML 1 + 8, 125° C.: 51, unsaturated fraction: 1.7 mol %) | 30 |
| Paraffinic mineral oil with $C_{aromatic}$: 2% | 30 |

-continued

| | |
|---|---|
| Carbon black N 550 | 10 |
| Al(OH)$_3$ with d$_{50}$ = 1 μm | 80 |
| Silicic acid/kaolinite mixture with d$_{50}$< | 10 |
| Zinc oxide, BET = 4.5 m$^2$/g | 5 |
| Stearic acids | 1 |
| Deovulc BG 187 (accelerator mixture) | 6 |
| Ground sulfur | 2.0 |
| Fire test 1 | Burner test |
| Extinguishing time, s | 50-100 |
| Assessment | Weakly |

| Mixture | 4 |
|---|---|
| Hardness, Shore A | 46 |
| Density, g/cm$^3$ | 1.22 |
| Tensile strength, N/mm$^2$ | 9.6 |
| Elong. at break % | 760 |

The burner test was carried out with the following set-up: The distance from the Bunsen burner to the sample was 140 mm. The sample body had a diameter of 42 mm with a thickness of 6 mm. It was flamed for 45 seconds. After the end of flaming, the afterburning behaviour was observed and the time till self-extinguishing was measured.

The fire test according to EN 45545-2 was carried out according to the defined standards.

The production of the example recipes was carried out either on a rolling mill or in an internal mixer:

When working on the rolling mill, the following sequence was employed: EPM/EPDM and if appropriate EVA were mixed together until a smooth rolled sheet was obtained. No roll cooling was employed in this case. In order to ensure homogeneity, before adding the additives the mixture sheet was alternately notched three times from the left and right to approximately ¾ of the roll width at an angle of approximately 45° and the thus detached mixture was applied again on the other side, referred to below as 3× left and right notching. Before beginning the admixing process of the other mixture components, the water cooling of the rolls is switched on. The addition of the solid and liquid additives proceeds in small amounts, with continuous gap adjustment. Once the rubber has absorbed all the substances, it is uniformly notched three times from the left and right in turn. The rolled sheet is removed from the roll and stored for 10 minutes at room temperature in order to allow cooling of the mixture and the roll. The accelerator is then added together with the sulfur. Once the mixture has absorbed the accelerator and sulfur, it is again notched three times from the left and right. Finally, the completed mixture is removed completely from the rolls and inverted six times. Alternatively, the rolled sheet is fed out, in and transverse to the roll direction. The rolled sheet is then removed in the desired sheet thickness.

When working with the internal mixer, the following sequence was employed:
Before beginning the mixing process, the mixing chamber was temperature controlled at 50° C.+/−5° C. First EPM/EPDM and if necessary EVA were filled and kneaded for 120 seconds with a lowered die. The solid and liquid additives were then added. The die was lowered and the mixture kneaded for a further 120 seconds. The die is then cleaned and the mixture is mixed for a further maximum of 60 seconds or until obtaining a mass temperature of 100° C. in the mixing chamber and then discharged. Mixture cooling and homogenisation takes place on the subsequent rolling mill by means of a stock blender. The coolant water temperature at the inlet has a maximum temperature of 30° C. The accelerator is added when the mixture has attained a temperature of approximately 80° C.+/−5° C. After further homogenising with the stock blender (5 cycles), the mixture sheet is taken from the roll and taken on a transport carriage for further processing.

The example recipes were prepared in an LH 50 A internal mixer (built in 1961), according to the above methods with a rotary speed of the tangential blades of 30 rpm. After discharging the mixture at 100° C., the mixture is cooled on a roller mill (Berstorff 1500 mm), as described above, and the accelerator mixed in. Mixture sheets having a thickness of 4 mm are taken from the roll and stored on a transport carriage until further processing.

The vulcanisation of the mixture in example 1 is carried out in a press at 160° C. for 30 minutes and at a pressure of 200 bar, however in each case after successful shaping and avoiding any shear stress; the vulcanisation of the mixture of examples 2 and 3 was carried out 180° C. for 10 minutes under otherwise identical conditions. Alternatively, the vulcanisation can also be carried out without pressure or at normal pressure, but in each case at elevated temperature, e.g. by continuous vulcanisation in the salt bath for profiles.

The thus obtained composition can undergo shaping and is subsequently vulcanised and used directly in this form, without further processing steps, as a flame-proofed article, for example as a profile. Alternatively, the resulting composition can also be further processed into a composite element and only be vulcanised after the end product has been produced.

The invention claimed is:

1. A flame retardant, vulcanised polymer composition, comprising:
   at least one halogen-free olefinic M-group elastomer as a polymer component with a saturated main chain at an amount of greater than 70 phr with respect to polymer components; wherein the at least one of the polymer component is single-phase and homogenous;
   at least one halogen-free water-releasing metal hydrate or a combination of different halogen-free water-releasing metal hydrates as flame retardant at an amount of in total 60 to less than 100 phr; and
   a mineral oil plasticiser in an amount of less than or equal to 50 phr; wherein a vulcanized matrix is formed by a sulphur or a sulphur-containing cross-linking system such that the cross-linking system extends over the entire matrix and is completely interspersed through the matrix; and
   wherein the entire composition is halogen-free.

2. The composition of claim 1, wherein the mineral oil plasticiser is in a maximum amount of less than or equal to 20 phr, or the composition is free of mineral oil plasticisers.

3. The composition of claim 1, wherein halogen-free olefinic elastomers are included at an amount of 100 phr as the only polymer components.

4. The composition of claim 1, wherein the water-releasing flame retardant includes magnesium hydroxide (MDH) or aluminium hydroxide (ATH), or a mixture thereof, and the water-releasing flame retardant is solid, in a powder or in a crystalline form.

5. The composition of claim 1, wherein the olefinic elastomer comprises a homopolymer or a copolymer or a terpolymer, with diene monomer units, and a diene-containing termonomer, wherein the termonomer is present in an amount of at least 0 wt. % to 12 wt. % with respect to the olefinic elastomer.

6. The composition of claim 1, wherein the olefinic elastomer is selected from the group consisting of ethylene propylene diene rubber (EPDM) and ethylene propylene rubber (EPM), and the composition includes ethylene propylene diene rubber (EPDM) and/or ethylene propylene rubber (EPM) as individual polymer components.

7. The composition of claim 1, wherein the olefinic elastomer is a rubber having an unsaturated side group, which is an ethylene propylene diene rubber (EPDM), which includes non-conjugated, diene monomer units, selected from the group consisting of 1,3-butadiene, 2-methyl-1,3-butadiene (isoprene), 2,3-dimethyl-1,3-butadiene, 1,3-pentadiene, 1,3-cyclopentadiene, dicyclopentadiene, 2-methyl-1,3-pentadiene, 1,3-hexadiene, 1,4-hexadiene, 1,4-cyclohexadiene, tetrahydroindene, methyl tetrahydroindene, ethylidene norbornene and/or 5-ethylidene-2-norbornene (ENB), 5-methylene-2-norbornene (MNB), 1,6 octadiene, 5-methyl-1,4hexadiene, 3,7-dimethyl-1,6-octadiene, 5-isopropylidene-2-norbornene, 5-vinyl-2-norbornene (VNB), wherein the ethylene propylene diene rubber (EPDM) is a terpolymer from ethylene, propylene and 5-ethylidene-2-norbornene (ENB) or dicyclopentadiene (DCPD).

8. The composition of claim 1, further comprising at least one further polymer component which is an R-group or Q-group silicone elastomer or a thermoplastic polymer, said polymer components of the composition being present as a homogeneous polymer mixture or a blend.

9. The composition of claim 8, wherein the at least one further polymer component is a vinyl-acetate-containing thermoplastic polymer, in particular a homopolymer, copolymer or terpolymer of vinyl acetate selected from the group consisting of polyvinyl acetate (PVAc) and ethylene vinyl acetate (EVA).

10. The composition of claim 9, wherein the vinyl-acetate-containing thermoplastic polymer has a melting temperature or a beginning of a melting region of less than 150° C., and the vinyl-acetate-containing thermoplastic polymer includes a vinyl acetate fraction of 40 to 75 wt. %, optionally, an uncross-linked, vinyl-acetate-containing polymer in an amount from 0 to 50 phr.

11. The composition of claim 8, further comprising ethylene propylene diene rubber (EPDM) or ethylene propylene rubber (EPM) or ethylene propylene diene rubber (EPDM) and ethylene vinyl acetate (EVA) as a homogeneous polymer mixture, or ethylene propylene rubber (EPM) and ethylene vinyl acetate (EVA) as a homogeneous polymer mixture, or ethylene propylene diene rubber (EPDM) and polyvinyl acetate (PVAc) as a homogeneous polymer mixture, or ethylene propylene rubber (EPM) and polyvinyl acetate (PVAc) as a homogeneous polymer mixture.

12. The composition of claim 8, wherein the polymer mixture is formed as an interpenetrating mixture from chains of the vinyl-acetate-containing polymers and the polymer mixture has sulphur cross-links, elastomer chains, and the polymer components are present as chemical, wide-mesh, cross-linked, spatial network molecules.

13. The composition of claim 1, wherein the polymer component or the polymer components of the composition are present together as in a substantially single-phase and homogeneous mixture-without a macroscopic and a microscopically visible phase separation, and the polymer components or the polymer mixture are free of dispersed vulcanised particles of elastomers or rubber domains with an average diameter greater than 0.5 µm.

14. The composition of claim 1, wherein the composition at a temperature of 150 to 200° C., has exclusively elastomer properties and has no thermoplastic properties, such that the composition is not formed as an olefin-based thermoplastic elastomer (TPE-0) or as a cross-linked olefin-based thermoplastic elastomer (TPE-V).

15. The composition of claim 1, wherein the composition has no melting peak as measured by dynamic differential scanning calorimetry at a temperature up to 200° C.

16. The composition of claim 1, wherein the composition has a loss factor of tan δ<0.3 in a temperature range from room temperature to approximately 200° C., said loss factor being a ratio of loss to storage modulus under dynamic shear stress.

17. The composition of claim 1, produced or obtained by producing the polymer component or by mixing the polymer components into a homogeneous blend, with the composition not being cross-linked and/or vulcanised and subsequent incorporation of a cross-linking agent, a flame retardant, additives and/or process materials, at a maximum temperature of 110° C., said composition shaped and vulcanised without shear stress, at an elevated temperature, optionally under pressure.

18. The composition of claim 17, obtained by static vulcanisation while avoiding shear stress and/or avoiding dynamic vulcanisation, after successful shaping.

19. The composition of claim 1, wherein the polymer components, of the entire composition, are halogen-free.

20. The composition of claim 1, further comprising:
an ethylene propylene diene rubber (EPDM) or ethylene propylene rubber (EPM) at an amount of 70-100 phr;
a vinyl-acetate-containing polymer, which is ethylene vinyl acetate (EVA) at an amount of 0-30 phr;
a mineral oil plasticiser at an amount of 0-10 phr;
a flame retardant, which is aluminium hydroxide (ATH) at an amount of 60 to less than 100 phr;
carbon black at an amount of 0-80 phr; and
the remainder being process materials and additives.

21. The composition of claim 1, wherein the composition has a hardness of 40 to 90 Shore A, a tensile strength >5 MPa, a wear volume <400 mm$^3$, a density <1.4 g/cm$^3$, and a MARHE value (ISO 5660-1) <90 kW/m$^2$, and complies with standard EN 45545-2.

22. A method for producing a flame retardant, vulcanised polymer composition according to claim 1, comprising:
first mixing together polymer component(s) with cross-linking agent(s), and flame retardant(s), and optionally, additives and process materials, in an absence of cross-linking and/or vulcanisation of the components so as to form a homogeneous mixture;
then shaping the polymer composition; and
then vulcanizing the polymer composition at a point in time selected from the group consisting of beginning of shaping, during the shaping, at the end of the shaping and after completed shaping as a static, non-dynamic vulcanisation, thereby avoiding creating shear stress.

23. The method of claim 22, wherein the mixing to form the mixture is carried out before the shaping at a temperature of at most 125° C. and for a time not critical for premature vulcanisation, wherein the mixture and/or polymer component(s) are present in a softened state during the mixing.

24. The method of claim 22, wherein the shaping is carried out at a temperature in a range from 70° C. to 100° C. and for a time not critical for premature vulcanisation.

25. The method of claim 22, wherein the vulcanising takes place at a temperature of at most 240° C., at an elevated pressure of 100 to 200 bar with respect to the mixing and/or the shaping.

26. A flame-retardant article, comprising a composition according to claim 1.

27. The article of claim 26, used as a spring element, a damping element, a seal, a hose, a mat, a moulded part, a protective clothing, or as an elastomer profile for windows or as a component thereof.

28. A composition, comprising:
- a halogen-free olefinic M-group elastomer as a polymer component with a saturated main chain at an amount of greater than 50 phr with respect to polymer components;
- a halogen-free water-releasing flame retardant or a combination of different halogen-free water-releasing flame retardants at an amount of in total 30 to less than 100 phr; and
- a mineral oil plasticiser having an amount of less than or equal to 50 phr,
- wherein the composition is formed into a matrix by a sulphur or a sulphur-containing cross-linking system such that the cross-linking system extends over the entire vulcanised matrix and is completely interspersed through the matrix.

29. The composition of claim 28, used as a spring element, a damping element, a seal, a hose, a mat, a moulded part, a protective clothing, or as an elastomer profile for windows or as a component thereof.

30. The composition of claim 28, wherein the flame retardant is zinc borate.

31. An elastic flame-proof composite element, suitable for damping oscillations and for suspension, comprising:
- a base body made from rubber and provided with a coating of a composition including a halogen-free olefinic M-group elastomer as a polymer component with a saturated main chain at an amount of greater than 50 phr with respect to polymer components, a halogen-free water-releasing flame retardant or a combination of different halogen-free water-releasing flame retardants at an amount of in total 30 to less than 100 phr and a mineral oil plasticiser having an amount of less than or equal to 50 phr, wherein a vulcanised matrix on a mixture matrix is formed by a sulphur or a sulphur-containing cross-linking system which extends over the entire vulcanised matrix and is completely interspersed through the matrix, said composition coating the base body at least partially or in sections, on an outer surface thereof, optionally, over the entire outer surface thereof.

32. The composite element of claim 31, used as a spring element, a damping element, a seal, a hose, a mat, a moulded part, a protective clothing, or as an elastomer profile for windows or as a component thereof.

* * * * *